UNITED STATES PATENT OFFICE.

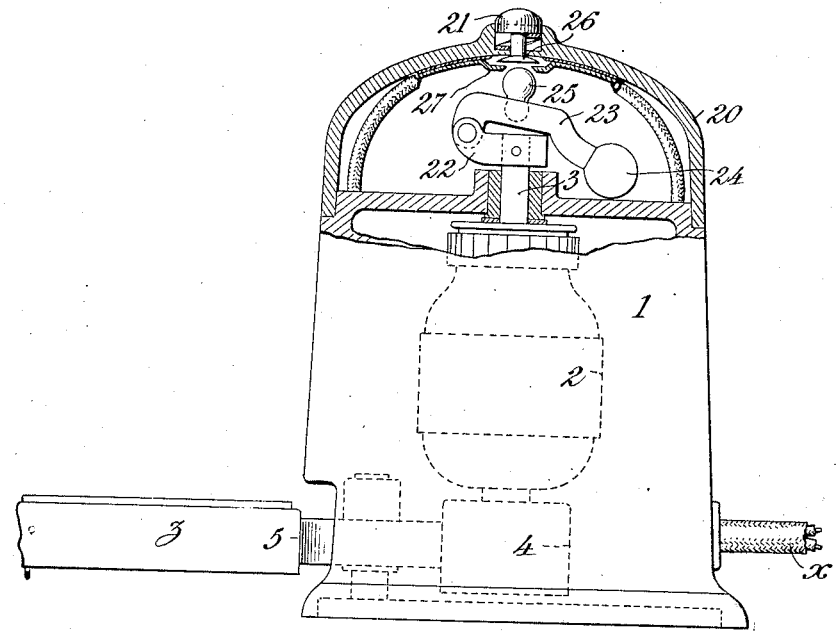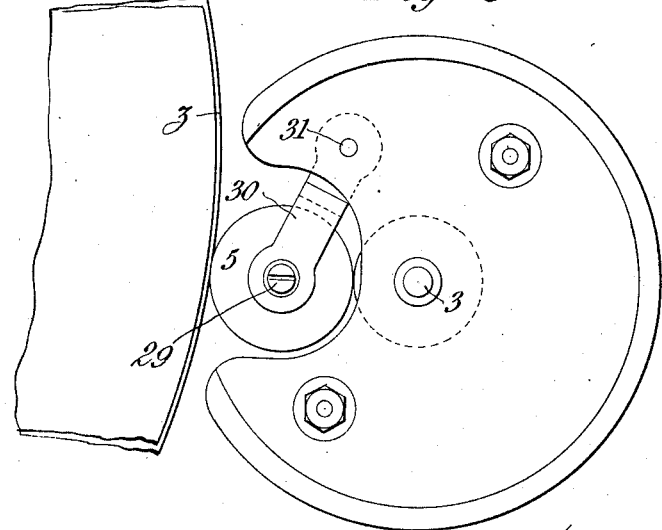

WILLIAM GENTRY SHELTON, OF NEW YORK, N. Y.

PHONOGRAPH-MOTOR.

1,350,571.   Specification of Letters Patent.   Patented Aug. 24, 1920.

Original application filed March 17, 1916, Serial No. 84,869. Divided and this application filed October 31, 1919. Serial No. 334,800½.

*To all whom it may concern:*

Be it known that I, WILLIAM GENTRY SHELTON, a citizen of the United States of America, residing in the borough of Manhattan, city, county, and State of New York, have invented certain new and useful Improvements in Phonograph - Motors, of which the following is a specification.

The object of this invention is to provide an electric switch which is automatically capable of closing the circuit upon the commencement of rotation of a motor driven part and of opening the circuit upon the cessation of such rotation or upon the speed falling below a predetermined minimum.

In the preferred embodiment of the invention the switch is controlled by a speed governor device, either a specially constructed governor exclusively for actuating the switch or the ordinary governor of the associated apparatus.

This switch is particularly useful in connection with independent motors for driving various mechanisms as for instance a motor for driving a phonograph record disk, and is particularly designed to open the motor circuit when the rotation of a record disk or its supporting platen is stopped or slowed down.

My invention may best be understood by reference to the accompanying drawings, wherein,—

Figure 1 is an elevation partly in central section illustrating one practicable embodiment of my invention showing the same applied to an independent talking machine motor.

Fig. 2 is an underside plan of the device shown in Fig. 1.

In the illustrated embodiment of the invention 1 designates the motor casing. This motor is illustrative of the type of independent talking machine motor wherein the rotating element 2 of the motor is provided with a vertically disposed shaft 3, having upon it a friction driving wheel 4 in surface engagement with a delivery driving wheel 5 adapted to engage the periphery of the platen *z* of a talking machine motor and drive this forwardly independently of the motive mechanism of the phonograph motor, but nevertheless under the control of the governor mechanism of such motor.

In the preferred installation, a normally open electric switch is placed in the motor circuit. In certain embodiments of the invention, it is preferable to have a switch which is held in its open position when the parts are at rest, and which automatically assumes a closed position upon the attainment of sufficient motor speed to assure the proper running of the mechanism. In other instances it is desirable to have the switch constructed to open when the associated parts are at rest and to be positively closed upon the attainment of the predetermined motor speed. The mechanism shown embodies the first mentioned structural features.

The motor spindle 3 carries a centrifugal device which in operation opens or closes a switch through which the current is conducted to drive the motor. The relation of these parts is such that when the motor is at rest, the switch is open; while when the motor is running at or above a prescribed speed, the switch is closed. Hence to start the motor in operation it is sufficient to drive it manually in any suitable way until it is brought up to a prescribed speed, whereupon the switch is closed and turns on the electric energy to continue the driving of the motor. If the motor stalls or is overloaded, so that its speed falls below the prescribed speed, the switch automatically opens and stops the motor.

The circuit may be closed either by rotating the driven part, as for instance, the phonograph platen *z* by hand, or by means of a hand controlled switch which may be held closed until the motor has been brought up to or above the prescribed speed.

The specific construction shown will now be described.

The casing 1 in Fig. 1 is shown carrying a dome-like cover 20 constituting a housing for the switch mechanism presently to be described. At the apex of the dome, there is shown mounted a spring-pressed push button 21 in electrical connection with one of the lead wires for the motor 2. An arm 22 is shown fast on the armature shaft 3. To this arm there is pivotally connected a lever 23 which for convenience may be termed the switch lever. This lever is shown extending from its pivotal connection with the arm 22 across the axis of rotation of the motor and to a sufficient distance beyond for giving efficiency to the governor weight 24. The parts are so proportioned and located that rotation of the shaft 3 raises the switch lever 23 and diminution of cessation of rotation thereof causes such lever to fall. The switch lever 23 is shown carrying a contact 25 which is in electrical connection with the other portion of the motor circuit. The contact 25 is shown in the form of a ball adapted to contact with the mushroom contact plate 26 carried by the stem of the push button. A suitable back stop and centering device 27 is provided for the contact portions 25 and 26.

The operation of this device is as follows: Assuming the cable $x$ to be connected in some suitable electrical circuit and the tractor wheel 5 to be in engagement with the disk supporting platen of a talking machine and the platen at rest, the operator depresses the push button 21 bringing the contacts 25 and 26 into engagement which closes the electric circuit through the motor, whereupon the armature revolves and causes the weight 24 and switch lever 23 to have a tendency to rise. Release of the push button 21 to its spring will return it to normal position. The tendency to rise of the governor mechanism-weight 24 and pivoted lever 23, keeps the contacts 25 and 26 in engagement, so that the circuit will be kept closed until some influence is brought to bear upon the shaft 3 to stop it or slow down its rotation, whereupon the weight 24 drops and the members 25 and 26 are disconnected and the circuit is broken.

The tractor wheel 5 is preferably given a certain amount of latitude in its bearings relative to the motor spindle 3. Its shaft 29 is shown mounted in a swinging framework 30 pivoted to the casing or housing at 31. This assures an efficient but yieldable surface engagement between the tractor and driver 4 irrespective of any irregularities in surface or elasticity of the parts.

The circuit may be closed either by rotating the driven part as for instance, the phonograph platen $z$, by hand, or by means of the push button 21 above described.

This invention is ideally adapted to the control of motor driven talking machines or other electrically driven elements which are capable of being manually started. In the operation of a talking machine or phonograph, it is customary after applying the record to give the platen a turn or push by hand so as to bring it quickly up to its normal speed. In so doing, the motor being frictionally entrained with the platen is speeded up and the centrifugal switch is caused to turn on the current to the motor, which keeps it running during the playing of the record. It is customary to apply some form of automatic stop which when the record is finished, applies a brake to the platen. When such automatic stop acts, the platen is retarded or wholly stopped whereby the motor is slowed down or stalled, and when this occurs, the electric switch instantly cuts off the current and thereby protects the motor.

This application is a division of my application, Serial No. 84,869, filed March 17, 1916. That application may be referred to for the illustration of a preferred specific construction of the automatic switch. The present application is designed to cover any centrifugal switch in its combination with a motor or motor driven part, such as a phonograph, which is capable of being started by hand or of being stopped by hand or otherwise independent of the stopping of the motor.

What I claim is:

1. The combination with an electrically driven part capable of manual starting, and its electric motor, of a switch controlling the circuit to such motor, and a speed-actuated means controlled by the driven part for operating such switch, the switch adapted to close the circuit at normal speed and open it to stop the motor at a speed below the normal, whereby the motor may be put in or out of circuit by the manual starting or retarding of such part.

2. The combination with a phonograph capable of being started by hand, and an electric motor for driving such phonograph, of means for putting the motor in or out of circuit comprising a switch and a speed-actuated means adapted to close the switch at normal speed and open it at a speed below the normal, whereby the motor is put into circuit by the act of manually starting the phonograph to normal speed, and is put out of circut by the act af manually stopping or retarding the phonograph.

3. The combination of claim 1 with manually-operated means for closing the circuit to the motor, whereby an auxiliary starting means is provided.

4. The combination of claim 2 with manually-operated means for closing such switch to start the motor.

5. The combination with an electric motor adapted for driving a phonograph, of a centrifugally-operated switch for closing the circuit to said motor at normal speed, and breaking said circuit at a speed below the normal, and manually-operated means for closing such circuit irrespective of the speed.

6. The combination with an electric motor adapted for driving a phonograph, of a switch closing the circuit to said motor, centrifugal means for closing such switch at normal speed, and opening it at a speed below the normal, and manually-operated means for closing such switch irrespective of the speed.

7. The combination with an electric motor adapted for driving a phonograph, of a switch closing the circuit thereto, centrifugal means carried by the motor for closing said switch at normal speed, a push-button, and means in connection therewith for closing the circuit to said motor irrespective of the speed.

8. The combination with an electric motor adapted for driving a phonograph, said motor having a casing and a revolving spindle having bearings therein, of a centrifugal device mounted on said spindle, a switch controlling the motor circuit mounted in said casing adapted to be closed by the centrifugal device at normal speed, and to be opened thereby at a speed below the normal, and a manually-operated part mounted on said casing and adapted to close said circuit irrespective of the speed of the motor.

In witness whereof I have hereunto signed my name.

WILLIAM GENTRY SHELTON.